Sept. 3, 1929.  B. STOCKFLETH ET AL  1,726,997
CRANKING MECHANISM FOR INTERNAL COMBUSTION ENGINES
Filed April 29, 1926   2 Sheets-Sheet 1
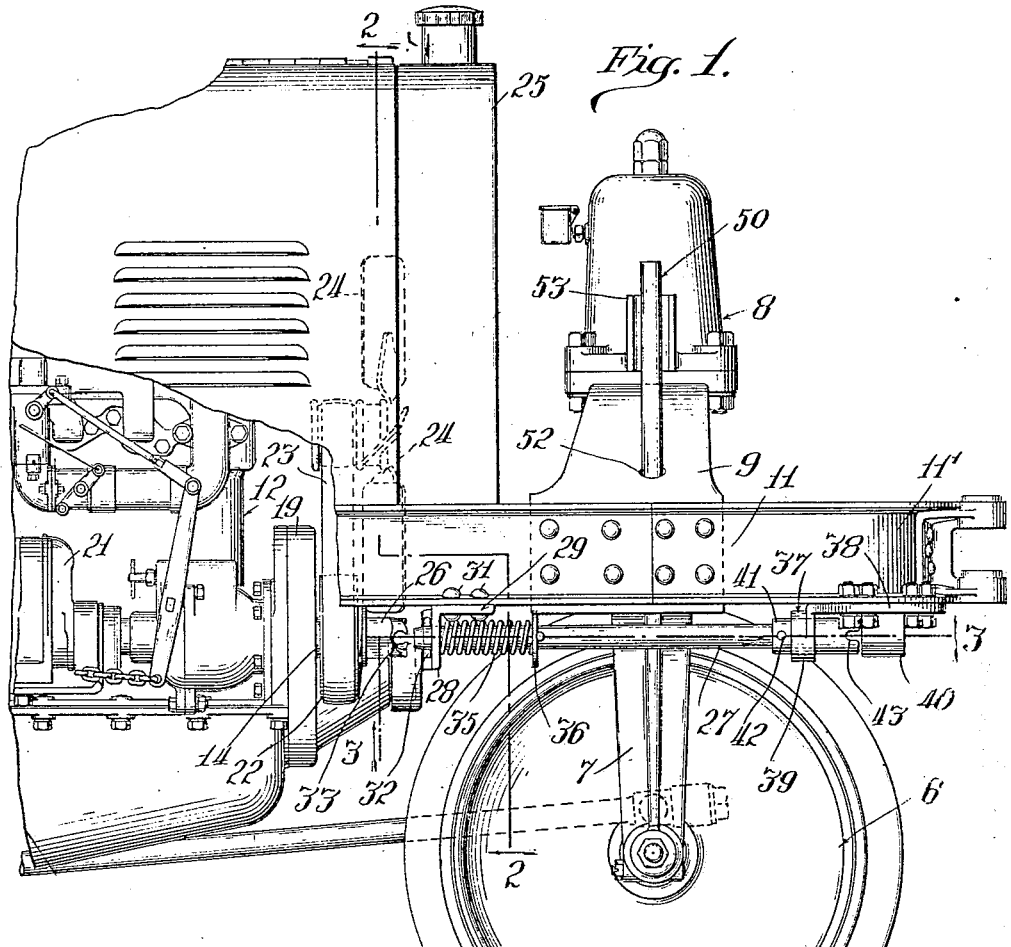
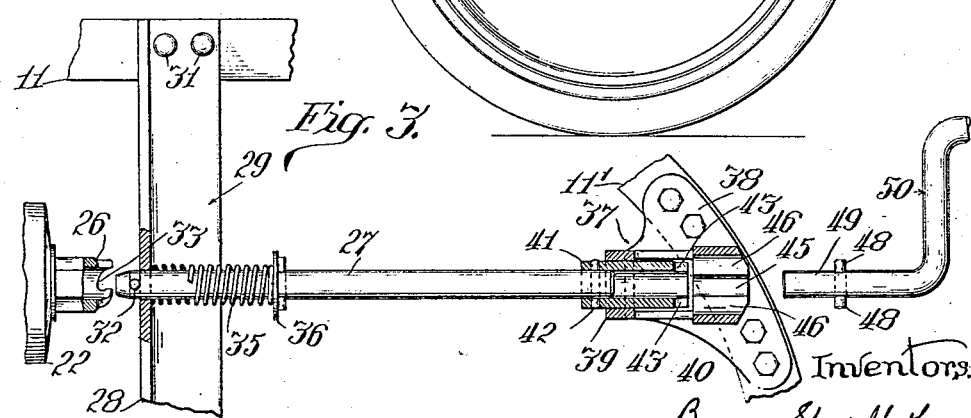

Sept. 3, 1929.  B. STOCKFLETH ET AL  1,726,997
CRANKING MECHANISM FOR INTERNAL COMBUSTION ENGINES
Filed April 29, 1926  2 Sheets-Sheet 2
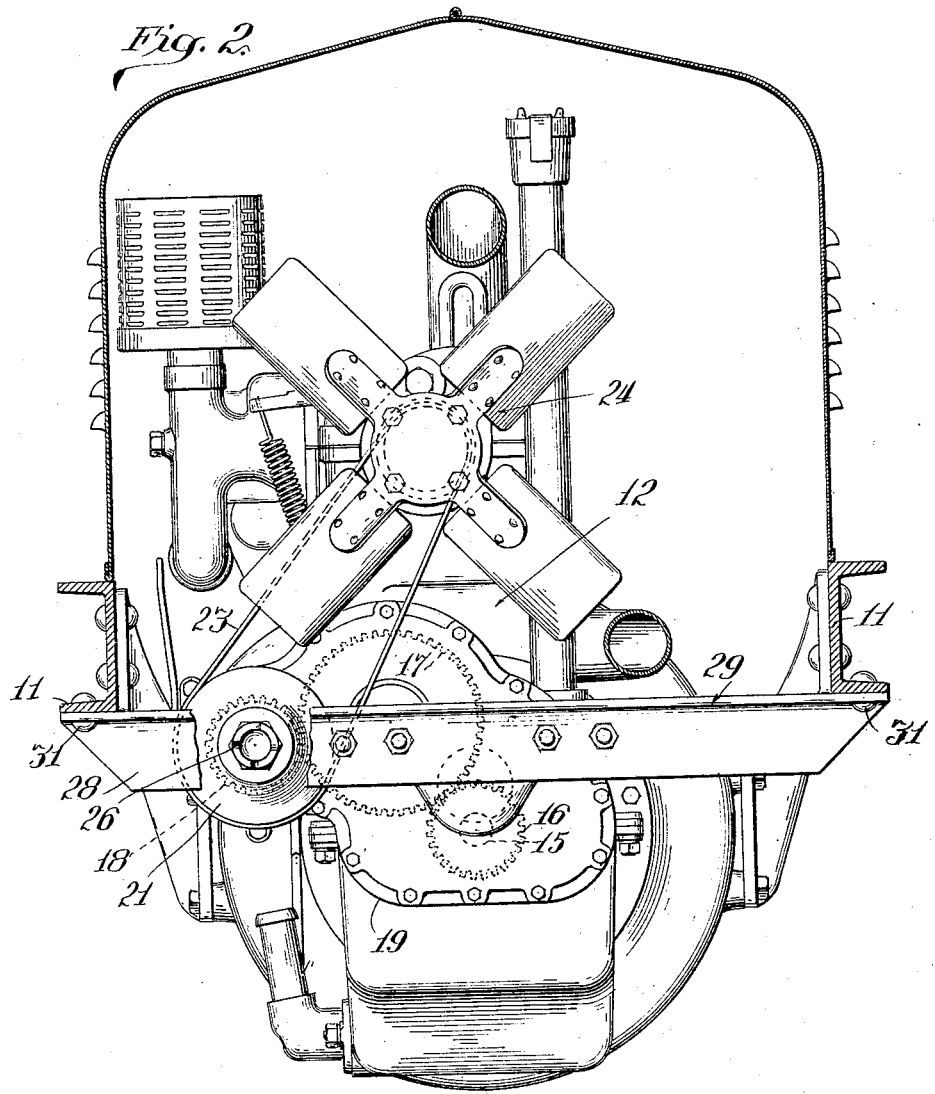
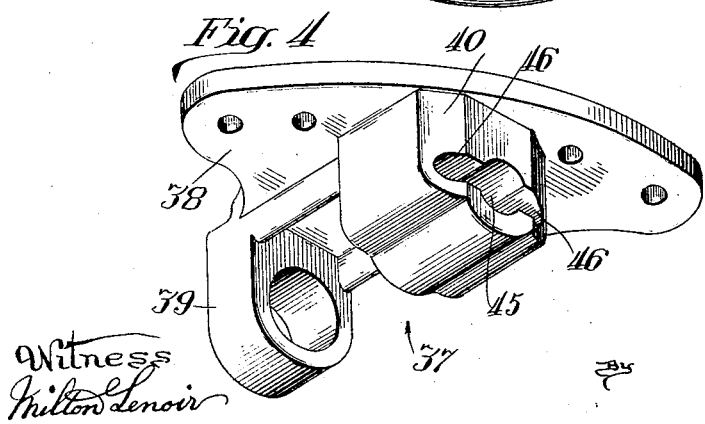

Patented Sept. 3, 1929.

1,726,997

UNITED STATES PATENT OFFICE.

BERGER STOCKFLETH, OF BERRIEN SPRINGS, AND FREDERICK W. BURGER, OF NILES, MICHIGAN, ASSIGNORS TO CLARK TRUCTRACTOR COMPANY, OF BUCHANAN, MICHIGAN, A CORPORATION OF MICHIGAN.

CRANKING MECHANISM FOR INTERNAL-COMBUSTION ENGINES.

Application filed April 29, 1926. Serial No. 105,448.

The present invention relates to cranking mechanism for internal combustion engines, and has as its principal object to provide an improved arrangement of cranking mechanism, through which the internal combustion engine of a vehicle can be cranked from a crank axis displaced laterally of the longitudinal axis of the engine.

The present construction of cranking mechanism has been developed for use in certain types of industrial trucks and tractors wherein the steering operation is performed through a single caster type of steering wheel, disposed at the engine end of the vehicle. This type of steering wheel, together with its supporting bearing, obstructs direct access to the crank shaft of the engine. The improved cranking mechanism herein disclosed avoids these difficulties by providing mechanism by which the engine may be cranked from a crank axis displaced laterally from the crank shaft of the engine.

More specifically, it is one of the objects of the invention to provide cranking mechanism which will crank an internal combustion engine through a secondary shaft of the engine, such as the magneto or pump shaft, or through the timing gears thereof.

Referring to the accompanying drawings, illustrating what we consider a preferred embodiment of our invention:

Figure 1 is a fragmentary view of the front end of a vehicle of the class described, a portion thereof being broken away;

Fig. 2 is a vertical sectional view taken approximately on the plane of the line 2—2 of Fig. 1;

Fig. 3 is a bottom plan view illustrating the cranking shaft, being taken approximately on the plane of the line 3—3 of Fig. 1; and Fig. 4 is a perspective view of the bearing bracket for the front end of this cranking shaft.

In these industrial types of trucks and tractors, to which the invention has particular application, the steering is performed through a single steering wheel 6 disposed at the engine end of the vehicle. In some instances this may be the front end of the vehicle and in other instances the rear end. As illustrative of a typical construction, this steering wheel is supported in a fork 7 which is journalled in an upright bearing 8, similarly to a caster wheel. This upright bearing 8 is mounted on a transversely extending frame member 9 secured to the side portions of the main frame 11. The steering wheel is disposed centrally of the frame, and in this position the wheel and its supporting fork 7 are in substantially alinement with the longitudinal axis of the engine 12. Hence, in this type of vehicle it is impossible to crank the engine through any longitudinally extending cranking handle or cranking shaft alined with the crank shaft of the engine.

In circumventing this difficulty we employ cranking mechanism which is effective to crank the engine through one of the engine driven rotating parts displaced laterally of the axis of the engine crank shaft. This is preferably effected through a secondary shaft 14 which is driven from the crank shaft 15 of the engine through one or more timing gears 16, 17, and 18 contained in a timing gear housing 19 at the end of the engine. The secondary shaft 14 is typical of the shafts usually provided for driving the magneto, water circulating pump or governor in these types of engines. In the present instance, this shaft drives a magneto 21 which furnishes the ignition current for the engine. The shaft 14 rotates at the same speed as the crank shaft 15 to secure properly timed relation of the magneto with the power strokes of the engine. The front end of the secondary shaft 14 is extended out through a bearing in the front wall of the gear housing 19 and supports a pulley 22, over which tracks the belt 23 for driving the air circulating fan 24. This fan creates a circulation of cooling air through the radiator 25, which is disposed directly behind the upright bearing member 8. Also mounted on the end of the shaft 14 beyond the pulley 22 is a jaw clutch 26. Alined with this jaw clutch is a third shaft 27 which extends forwardly to the end of the vehicle and which serves as a cranking shaft. The inner end of this shaft 27 has bearing support in the flange 28 of an angle member 29 extending transversely of the frame, the ends of this angle member being riveted to the side members 11 of the frame as indicated at 31. This end of the shaft 27 has a transversely extending pin 32 secured therein, the projecting ends of which are adapted to engage in the teeth of the clutch 26. As is customary, the leading surfaces on these teeth are sloped as indicated at 33 so that the clutch will compel disengagement between itself and the pin projections 32 after the engine starts operating. The cranking shaft 27 is normally held in retracted position out of engagement with the clutch 26 by a compression spring 35, which bears at one end against the flange 28 and at the other end against a collar 36 pinned or otherwise secured to the shaft 27. The front or opposite end of the cranking shaft 27 is supported in a bearing bracket 37, which is bolted to the underside of the curved frame member 11'. As best shown in Fig. 4, this bearing bracket comprises an attaching plate 38, by which it is bolted to the frame member 11', and two spaced bosses 39 and 40 extending downwardly from said attaching plate. A sleeve 41 is suitably secured to the adjacent end of the shaft 27, as by the transverse pin 42, and this sleeve is journalled for rotation in the bearing boss 39. The open end of said sleeve has two diametrically opposite notches or slots 43 therein for receiving the two pinlike projections 48 usually provided on the shank 49 of the conventional starting crank 50. Such shank portion of the crank is receivable in the socketlike open end of sleeve 41. The depending boss portion 40 is formed with a bore 45 which is just of sufficient size to receive the shank portion of the starting crank. Extending completely through the boss 40 at opposite sides of the bore 45 are two grooves or recesses 46, through which the pin projections 48 on the shank of the starting crank are passed in inserting the crank into operative position. After the shank portion of the starting crank has been inserted through the boss 40 to bring its pin projections into engagement with the notched end of the sleeve 41, the starting crank cannot be removed until these pin projections have been alined with the grooves 46. Such pin projections are so placed in the shank portion of the crank that when the handle end is hanging downwardly in the position that it will normally assume under the action of gravity, they will lie in a vertical plane out of registry with the grooves 46. Hence, the crank is normally supported in the boss or hanger 40, being removable therefrom only when the handle end of the crank has been swung up to a horizontal position to bring the pin projections 48 into alinement with the grooves 46.

With the crank in position, endwise thrusting pressure applied thereto is effective to shift the cranking shaft 27 into clutching engagement with the jaw clutch 26, after which the engine can be cranked in the same manner as when applying cranking effort directly to the end of the crank shaft. A particular advantage inherent in thus cranking through the magneto shaft resides in the fact that the magneto shaft rotates at engine speed and thus the engine can be cranked with the same speed of rotation as when the starting crank is connected directly to the crank shaft. Furthermore, the magneto shaft is disposed a sufficient distance to one side of the axis of the engine to place the cranking shaft 27 in such position that it will not interfere with the rotative movement of the steering wheel 6 and its supporting fork 7 in the operation of steering the vehicle.

For carrying the crank after it has been removed from the bearing boss 40, a mounting socket 52 is provided in the transversely extending frame member 9 for receiving the shank end of the crank, and a grooved bracket 53 is provided alongside the upright bearing 8 for receiving the handle end of the crank (Fig. 1).

What we claim as our invention and desire to secure by Letters Patent of the United States, is:

1. In a vehicle of the class described, the combination of a frame, an internal combustion engine mounted on said frame and comprising a crank shaft extending longitudinally thereof and a secondary shaft continuously driven thereby, a caster wheel swiveled at one end of said frame, said caster wheel obstructing direct cranking connection between a hand crank and the crank shaft of the engine, and means extending below the frame for cranking said engine from the front of the frame through said secondary shaft.

2. In a vehicle, the combination of a frame, an internal combustion engine mounted on said frame and comprising a crank shaft and a secondary shaft parallel with and continuously driven from said crank shaft, and a third shaft having bearing support below said frame in alignment with said secondary shaft, adapted to effect clutching engagement with said secondary shaft, said engine being cranked through said third shaft.

3. In a vehicle, the combination of a frame, an internal combustion engine mounted on said frame, and comprising a crank shaft extending longitudinally thereof, a hand crank having a projecting shoulder thereon, a cranking shaft adapted to transmit rotation to said crank shaft, and a bearing bracket mounted on the frame for supporting said cranking shaft for longitudinal movement therein, said bracket having a bore therein for receiving the shank of said hand crank and having a longitudinal groove communicating with said bore for receiving the projecting shoulders on said hand crank.

4. In a vehicle, the combination of a frame, an internal combustion engine mounted on said frame, a hand crank having a projecting shoulder thereon, a cranking shaft adapted to transmit rotation to said engine, and a bearing bracket for said cranking shaft mounted on said frame, said bracket having a bore therein for receiving the shank of said hand crank and having a longitudinal groove communicating with said bore for receiving the projecting shoulder on said hand crank, said groove and the shoulder on said hand crank being so related as to prevent disengagement of said hand crank from said bearing bracket when the handle of said hand crank is hanging downwardly.

5. In a vehicle, the combination of a frame, an internal combustion engine mounted on said frame, said engine comprising a crank shaft and a second shaft parallel with and driven from said crank shaft through timing gears journalled in said engine, a third shaft alined with said second shaft and movable endwise relatively thereto, bearing means rotatably and reciprocably supporting the end portions of said third shaft on said frame, clutch means for operatively connecting said second and third shafts, spring means cooperating with said third shaft for normally maintaining said clutch means out of engagement, a hand crank, and socket means on said third shaft for receiving said hand crank.

6. In a vehicle propelled by an internal combustion engine located at the front thereof, a frame mounted in front of the engine, a steering wheel carried by said frame and located in longitudinal alignment with the crank shaft of the engine, means for controlling the engine, an auxiliary shaft geared to the crank shaft for controlling said means, a third shaft in alignment with said auxiliary shaft and carried by said frame, and clutching means controlled by a hand crank for coupling the third shaft to the second shaft to permit the cranking of said engine through said shaft.

BERGER STOCKFLETH.
FREDERICK W. BURGER.